US008958201B2

(12) United States Patent
Leung

(10) Patent No.: US 8,958,201 B2
(45) Date of Patent: Feb. 17, 2015

(54) FLEXIBLE MOBILE COMPUTING DEVICES

(75) Inventor: Kwok Ching Leung, Richmond Hill (CA)

(73) Assignee: BlackBerry Limited, Waterloo, Ontario (CA)

( * ) Notice: Subject to any disclaimer, the term of this patent is extended or adjusted under 35 U.S.C. 154(b) by 562 days.

(21) Appl. No.: 13/087,582

(22) Filed: Apr. 15, 2011

(65) Prior Publication Data

US 2012/0262870 A1 Oct. 18, 2012

(51) Int. Cl.
*G06F 1/16* (2006.01)

(52) U.S. Cl.
CPC ............ *G06F 1/1626* (2013.01); *G06F 1/1652* (2013.01); *G06F 1/1681* (2013.01)
USPC ..................... 361/679.27; 361/749; 455/575.3

(58) Field of Classification Search
CPC ... G06F 1/1652; G06F 1/1641; G06F 1/1601; G06F 1/1616; G06F 1/1681; G06F 2203/04102; G06F 3/0488; G06F 3/0416; G06F 3/01; G06F 3/0412; G06F 1/183; G06F 1/1683; G06F 1/1626; G06F 1/1656; G06F 1/1684; G06F 3/003; G06F 3/0338; G06F 3/0414; G06F 1/1615; G06F 1/1637; G06F 2203/04101; G06F 2203/04105; G06F 3/011; G06F 3/016; G06F 3/0425; G06F 3/044; H05K 7/14; H05K 1/189; H05K 2201/0133; H05K 2201/2009; H05K 3/284; H05K 7/1417; H05K 5/0278; H05K 1/0283; H05K 1/03; H05K 1/036; H05K 1/0393; H05K 1/147; H05K 1/16; H05K 2201/09263; H05K 2203/0271; H05K 3/207; H05K 3/323; H05K 1/0274; H05K 1/0306; H05K 1/117; H05K 2201/0108; H05K 2201/0329; H05K 2201/09036; H05K 2201/10106; H05K 2203/1316; H05K 2203/161; H05K 3/0061; H05K 3/107; H05K 3/244; H05K 3/28; H05K 3/403; G09F 7/18; H04M 1/0268
USPC ............. 361/679.01, 679.02, 679.09, 679.21, 361/679.22, 679.26, 679.27, 361/679.55–679.58, 749; 455/575.1–575.4; 345/173; 349/58–60; 379/433.11–433.13; 248/917–924
See application file for complete search history.

(56) References Cited

U.S. PATENT DOCUMENTS 6,307,751 B1 * 10/2001 Bodony et al. ................ 361/749
6,421,235 B2    7/2002 Ditzik
(Continued)

FOREIGN PATENT DOCUMENTS

DE           10131547    1/2003
EP         1635313 A2    3/2006
(Continued)

OTHER PUBLICATIONS

Schwesig et al., "Gummi: A Bendable Computer," CHI 2004, Apr. 2004, Vienna, Austria, vol. 6, No. 1, pp. 263-270 (8 pages).
(Continued)

*Primary Examiner* — Anthony Haughton
*Assistant Examiner* — Ingrid Wright
(74) *Attorney, Agent, or Firm* — Fish & Richardson P.C.

(57) ABSTRACT

A flexible mobile computing device includes a flexible display having a first display portion, a second display portion, and a third display portion positioned, along a longitudinal axis of the device, between the first and second display portions. The device also includes a printed circuit board (PCB) portion positioned behind the first display portion. Additionally, the device includes a battery portion positioned behind the second display portion. The device also includes a flexible connector positioned behind the third display portion, extending along a latitudinal axis of the device, and connecting the PCB portion to the battery portion. The flexible connector is configured to permit the first display portion to twist relative to the second display portion about an axis of the device other than the latitudinal axis. In addition, the flexible connector is configured to permit inward and outward bending of the device.

18 Claims, 6 Drawing Sheets

(56) References Cited

U.S. PATENT DOCUMENTS

| | | | |
|---|---|---|---|
| 6,444,352 B1* | 9/2002 | Herrmann et al. | 429/96 |
| 6,577,496 B1 | 6/2003 | Gioscia et al. | |
| 6,798,052 B2* | 9/2004 | Green | 257/679 |
| 6,968,056 B2 | 11/2005 | Barnett et al. | |
| 7,050,293 B2* | 5/2006 | Arbisi et al. | 361/679.3 |
| D537,426 S | 2/2007 | Arbisi | |
| 7,251,323 B2 | 7/2007 | Holtorf et al. | |
| D551,640 S | 9/2007 | Wolf et al. | |
| D565,018 S | 3/2008 | Arbisi | |
| 7,398,114 B2 | 7/2008 | Gartrell | |
| 7,492,891 B2 | 2/2009 | Eldon | |
| D589,923 S | 4/2009 | Kim et al. | |
| 7,532,916 B2 | 5/2009 | Lee et al. | |
| 7,587,225 B2 | 9/2009 | Kim et al. | |
| 7,596,395 B2 | 9/2009 | Gartrell | |
| 7,787,917 B2 | 8/2010 | Aoki et al. | |
| 8,194,399 B2* | 6/2012 | Ashcraft et al. | 361/679.05 |
| 8,226,442 B2* | 7/2012 | Uusimaki et al. | 439/630 |
| 8,462,106 B2* | 6/2013 | Tziortzis et al. | 345/156 |
| 2005/0054395 A1* | 3/2005 | Arbisi et al. | 455/575.3 |
| 2006/0089182 A1 | 4/2006 | Gartrell | |
| 2007/0117600 A1 | 5/2007 | Robertson, Jr. et al. | |
| 2008/0300031 A1 | 12/2008 | Cho et al. | |
| 2010/0141605 A1* | 6/2010 | Kang et al. | 345/174 |

FOREIGN PATENT DOCUMENTS

| | | |
|---|---|---|
| JP | 2006019853 | 1/2006 |
| WO | WO2008133508 A1 | 6/2008 |

OTHER PUBLICATIONS

Melanson, Donald, "Nokia patent application points to flexible phone displays," posted Jan. 19, 2010, available at http://www.engadget.com/2010/01/19/nokia-patent-application-points-to-flexible-phonedisplays/ (last visited Apr. 14, 2011) (3 pages).

"Cambridge, Nokia introduce new stretchable and flexible mobile phone concept," available at www.physorg.com/news123167268.html, (last visited Apr. 14, 2011) (2 pages).

"Trou—Hologram Projecting Flexible Mobile Phone Concept," available at http://petitinvention.wordpress.com/2009/06/10/trou/ (last visited Apr. 14, 2011) (11 pages).

"Kyocera's flexible, folding phone concept," posted Apr. 14, 2009, available at http://www.core77.com/blog/object_culture/kyoceras_flexible_folding_phone_concept_13184.asp (last visited Apr. 14, 2011) (3 pages).

Extended European Search Report dated Sep. 14, 2011 issued in European Application No. 11162663.6-1245 (7 pages).

* cited by examiner

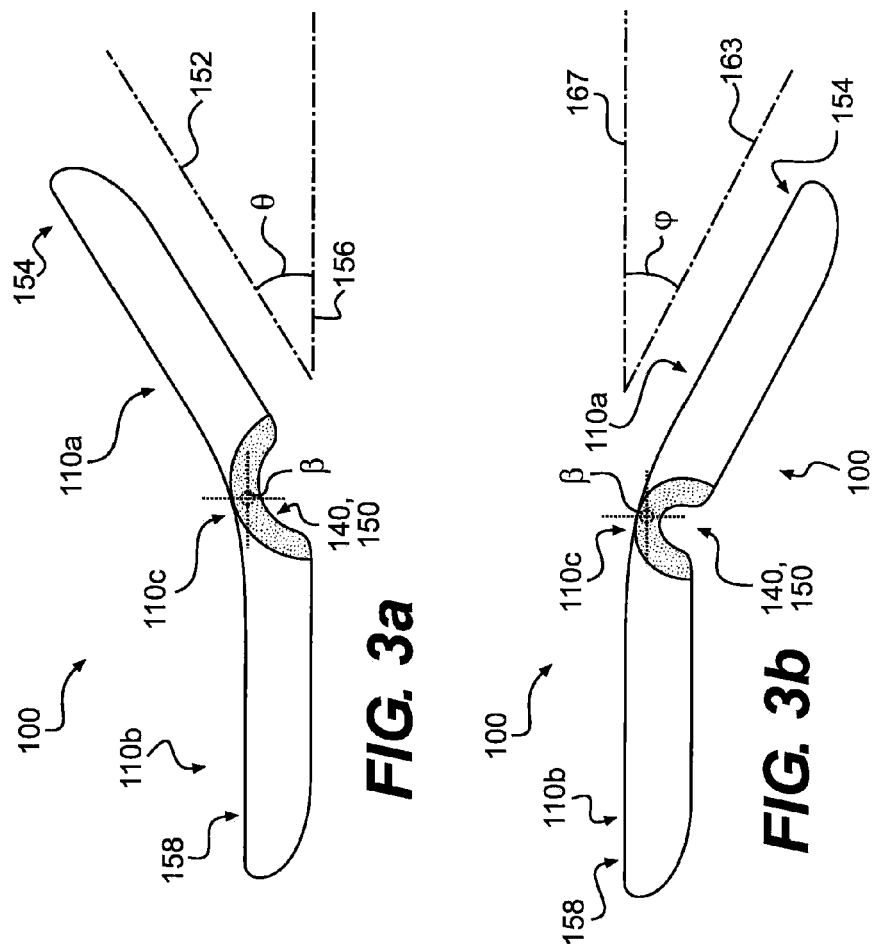

FLEXIBLE MOBILE COMPUTING DEVICES

FIELD

This disclosure relates generally to computing devices and, more particularly, to flexible mobile computing devices.

BACKGROUND INFORMATION

Mobile computing devices such as, for example, mobile phones, tablet computers, e-Readers, and personal digital assistants are becoming increasingly useful. With this increased usefulness, many users of mobile computing devices prefer to carry the mobile computing devices in their pants pockets.

The increased usefulness of the mobile computing devices can result from or lead to the mobile computing devices having larger displays. And users of conventional rigid mobile computing devices having larger displays sometimes find carrying the mobile computing devices in their pants pockets problematic. Specifically, the users might find carrying the mobile computing devices in their front pants pockets uncomfortable and could fear that carrying the mobile computing devices in their back pants pockets will break the mobile computing devices.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

FIGS. 3a and 3b are side views of the computing device of FIG. 1 in bent configurations consistent with disclosed embodiments;

DETAILED DESCRIPTION

Figure 1:
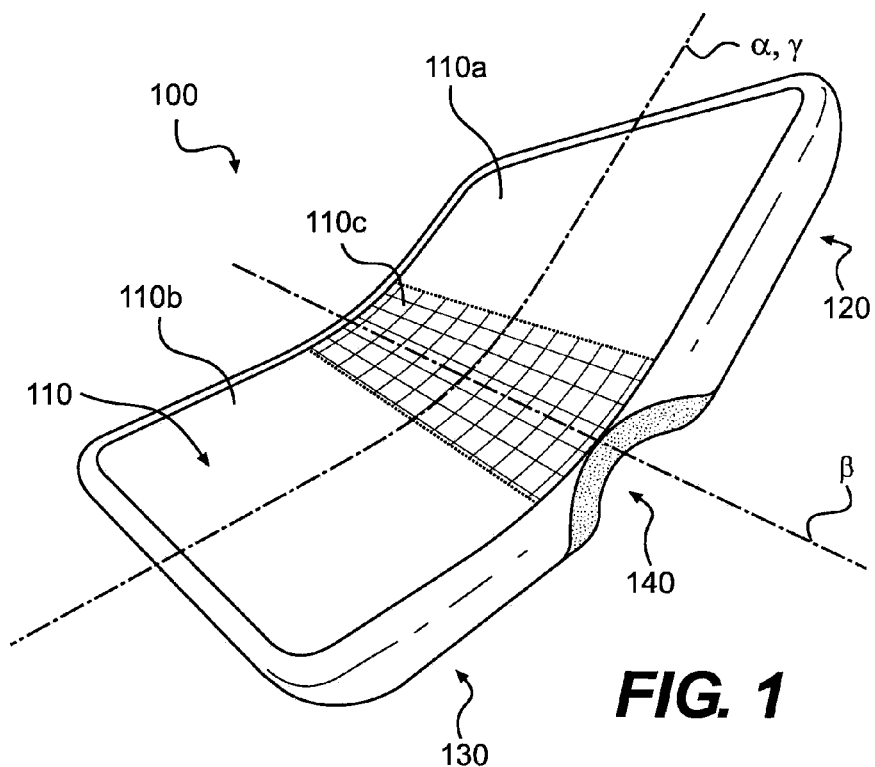
FIG. 1 is a pictorial view of a computing device consistent with disclosed embodiments.

Reference will now be made in detail to exemplary embodiments, examples of which are illustrated throughout the drawings. Wherever possible, the same reference numbers are used in the drawings and the description to refer to the same or like parts.

As illustrated in FIG. 1, an exemplary flexible mobile computing device 100 includes a flexible display 110, a printed circuit board (PCB) portion 120, a battery portion 130, and a flexible connector 140. For example, device 100 may be a mobile phone, a tablet computer, an e-Reader, a personal digital assistant, or another type of mobile computing device.

It is contemplated that flexible display 110 includes a flexible organic light-emitting diode (OLED) display, a flexible e-ink display, a flexible liquid crystal display (LCD), or another type of flexible display. Flexible display 110 has a first display portion 110a, a second display portion 110b, and a third display portion 110c.

As shown in FIG. 1, third display portion 110c is positioned, along a longitudinal axis α of device 100, between first display portion 110a and second display portion 110b. For example, longitudinal axis α may be an axis extending along a length direction of device 100, and may be positioned centrally along a width and a depth of device 100. PCB portion 120 is positioned behind first display portion 110a; battery portion 130 is positioned behind second display portion 110b; and flexible connector 140 is positioned behind third display portion 110c. Thus, it should be understood that flexible display 110 extends continuously, without breaks or seams, from an area above PCB portion 120, across flexible connector 140, to an area above battery portion 130.

Flexible connector 140, which may be comprised of thermoplastic polyurethane (TPU), silicone rubber, or another rubberlike substance, extends along a latitudinal axis β, which is perpendicular to longitudinal axis α, of device 100. Flexible connector 140 connects PCB portion 120 to battery portion 130, and is configured to permit first display portion 110a to twist relative to second display portion 110b about an axis γ of device 100 other than latitudinal axis β. For example, axis γ may be longitudinal axis α of device 100. Alternatively, axis γ may be parallel to or angled relative to longitudinal axis α. It is contemplated that such twisting may allow device 100 to more easily fit in a user's pocket, for example.

Figure 2A:
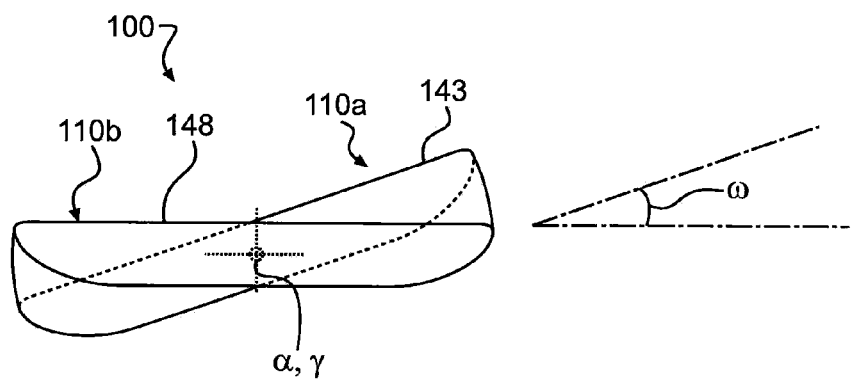
FIGS. 2a and 2b are front views of the computing device of FIG. 1 in twisted configurations consistent with disclosed embodiments.
Figure 2B:
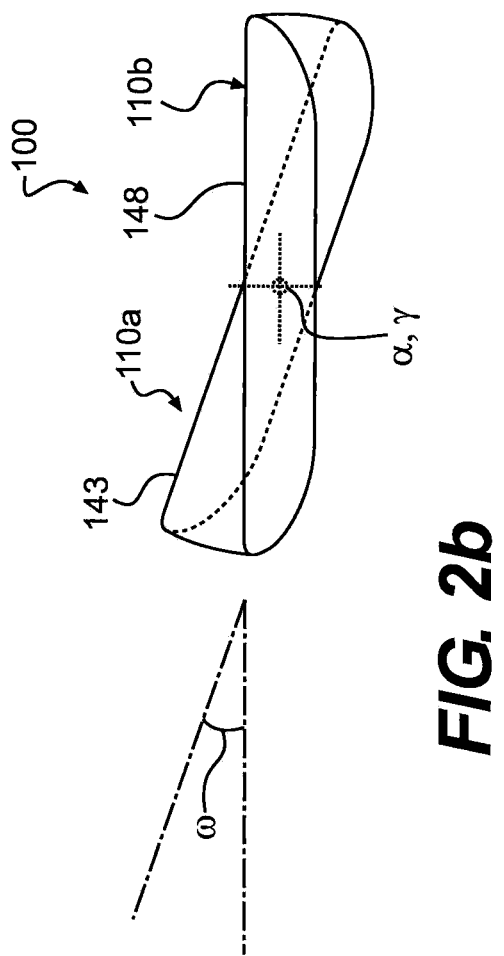

As illustrated in FIGS. 2a and 2b, flexible connector 140 is configured to permit first display portion 110a to twist clockwise and counterclockwise relative to second display portion 110b about axis γ such that a maximum twisting angle ω of first display portion 110a relative to second display portion 110b is in a range of approximately 1° to approximately 45° for both clockwise twisting and counterclockwise twisting. More specifically, maximum twisting angle ω may be in a range of approximately 5° to approximately 35°. For example, maximum twisting angle ω may be approximately 30°. It should be understood from FIGS. 2a and 2b that maximum angle ω is determined, while viewing device 100 along axis γ and maximally twisting first display portion 110a relative to second display portion 110b by using force manually applied by an individual's hands, by measuring an acute angle formed by the intersection of (i) an edge 143 of first display portion 110a positioned farthest from third display portion 110c, and (ii) an edge 148 of second display portion 110b positioned farthest from third display portion 110c.

As illustrated in FIGS. 3a and 3b, flexible connector 140 is also configured to permit inward bending (referring to FIG. 3a) and outward bending (referring to FIG. 3b) of device 100. It is contemplated that such bending may allow device 100 to more easily fit in a user's pocket, for example. As used herein, inward bending of device 100 refers to bending of device 100 that causes a rear surface 150 of flexible connector 140 to expand, and outward bending of device 100 refers to bending of device 100 that causes rear surface 150 of flexible connector 140 to contract. To facilitate the expansion/contraction, it is contemplated that rear surface 150 may be concave. In other words, rear surface 150 may be recessed into device 100 relative to PCB portion 120 and battery portion 130.

Referring to FIG. 3a, flexible connector 140 is configured to permit inward bending of device 100 such that a maximum inward bending angle θ formable between first display portion 110a and second display portion 110b is in a range of approximately 1° to approximately 60°. More specifically, maximum inward bending angle θ may be in a range of approximately 5° to approximately 50°. For example, maximum inward bending angle θ may be approximately 45°. It should be understood from FIG. 3a that maximum inward bending angle θ is determined, while viewing device 100 along latitudinal axis β and bending device 100 to maximally expand rear surface 150 of flexible connector 140 by using force manually applied by an individual's hands, by measuring an acute angle formed by the intersection of (i) a line 152 parallel to a planar section of a front surface 154 of first display portion 110a positioned farthest from third display portion 110c, and (ii) a line 156 parallel to a planar section of a front surface 158 of second display portion 110b positioned farthest from third display portion 110c.

Referring to FIG. 3b, flexible connector 140 is configured to permit outward bending of device 100 such that a maximum outward bending angle φ formable between first display portion 110a and second display portion 110b is in a range of approximately 1° to approximately 45°. More specifically, maximum outward bending angle φ may be in a range of approximately 5° to approximately 35°. For example, maximum outward bending angle φ may be approximately 30°. It should be understood from FIG. 3b that maximum outward bending angle φ is determined, while viewing device 100 along latitudinal axis β and bending device 100 to maximally contract rear surface 150 of flexible connector 140 by using force manually applied by an individual's hands, by measuring an acute angle formed by the intersection of (i) a line 163 parallel to a planar section of front surface 154 of first display portion 110a positioned farthest from third display portion 110c, and (ii) a line 167 parallel to a planar section of front surface 158 of second display portion 110b positioned farthest from third display portion 110c.

Figure 4:
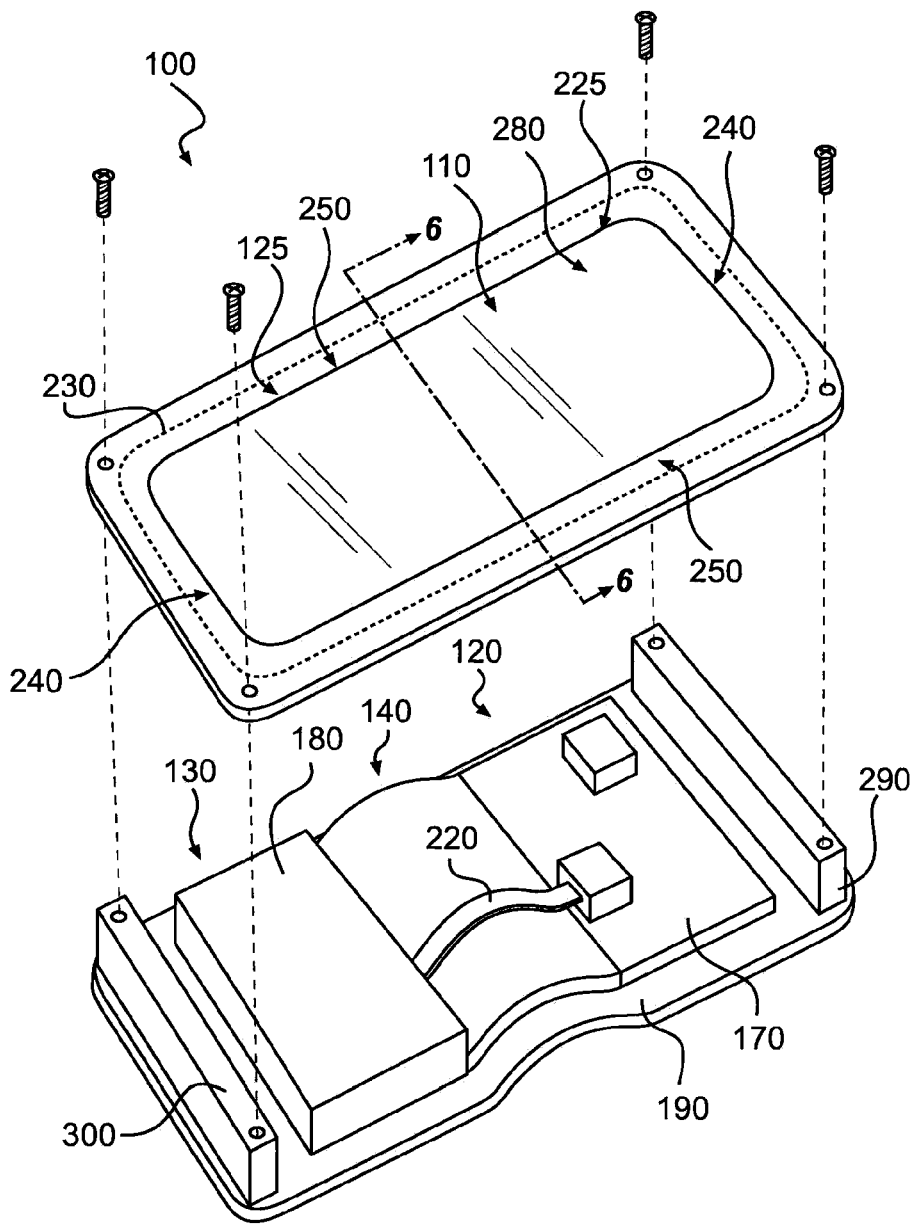
FIG. 4 is a partially-exploded view of another computing device consistent with disclosed embodiments.
Figure 5:
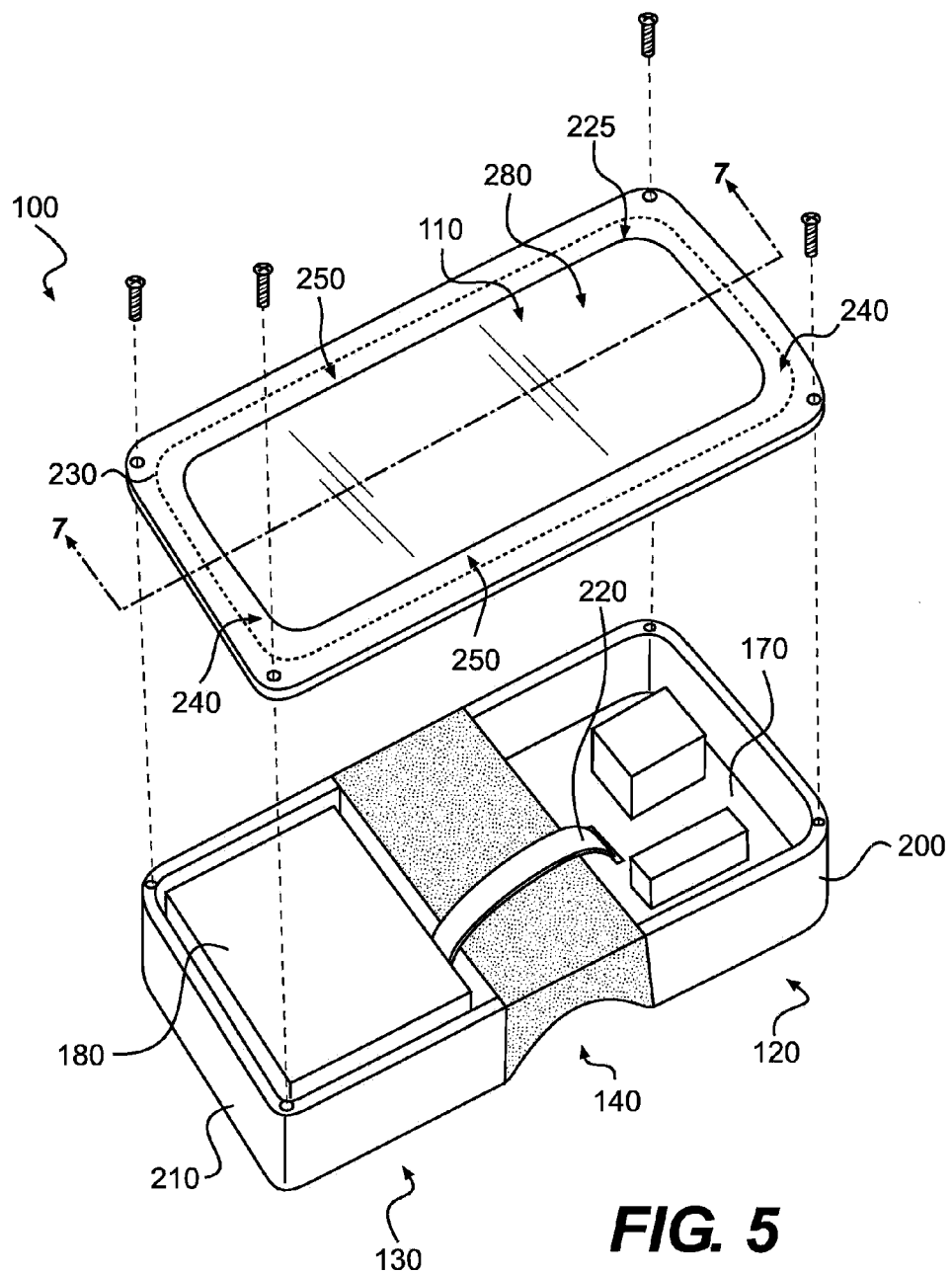
FIG. 5 is a partially-exploded view of yet another computing device consistent with disclosed embodiments.

As mentioned above, flexible connector 140 connects PCB portion 120 to battery portion 130. More specifically, as illustrated in FIGS. 4 and 5, flexible connector 140 connects a PCB 170 of PCB portion 120 to a battery 180 of battery portion 130. It is contemplated that this connection may be direct (i.e., via no other components, as shown in FIG. 4) or indirect (i.e., via other components, as shown in FIG. 5).

As illustrated in FIG. 4, device 100 includes a flexible rear housing 190 positioned behind and covering the rear surfaces of PCB portion 120, battery portion 130, and flexible connector 140. For example, flexible rear housing 190 may be comprised of fabric, plastic, glass fiber, carbon fiber, metal mesh, TPU, silicone rubber, synthetic rubber, natural rubber, polypropylene, polyethylene, or another flexible material. In such an embodiment, PCB 170 and battery 180 are rigid, and flexible connector 140 is adhered directly to PCB 170 and battery 180. As employed herein, the expression "adhered" and variations thereof shall refer broadly to an arrangement in which two or more items are fastened together such as by the use of glue, cement, or other adhesive, or through the use of a fusion or other joining process, and between which an adhesive bond or other fusion bond has been created.

Alternatively, as illustrated in FIG. 5, PCB portion 120 includes a rigid PCB housing 200, and battery portion 130 includes a rigid battery housing 210. For example, rigid PCB housing 200 and rigid battery housing 210 may be comprised of metal, carbon fiber, hard plastic (e.g., polycarbonate (PC), acrylonitrile butadiene styrene (ABS), acrylic, or another moldable polymer), or another rigid material. In such an embodiment, rigid PCB housing 200 is connected to PCB 170, and rigid battery housing 210 is connected to battery 180. Flexible connector 140 is adhered to rigid PCB housing 200 and rigid battery housing 210, and thereby indirectly connects PCB 170 to battery 180.

In addition to flexible connector 140, other parts of device 100 may also connect PCB portion 120 to battery portion 130. For example, device 100 may include a cable 220 that electrically connects PCB 170 to battery 180. Although FIGS. 4 and 5 illustrate cable 220 as being positioned in front of flexible connector 140, it should be understood that cable 220 may alternatively be positioned within or behind flexible connector 140.

Figure 6:
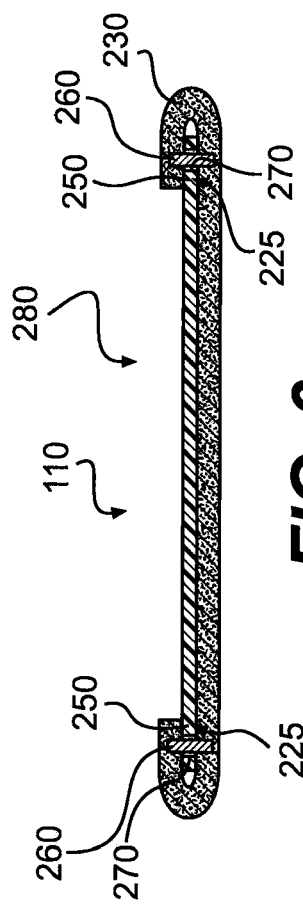
FIG. 6 is a cross-section view of a front housing and a display taken along line 6-6 of FIG. 4 consistent with disclosed embodiments.
Figure 7:
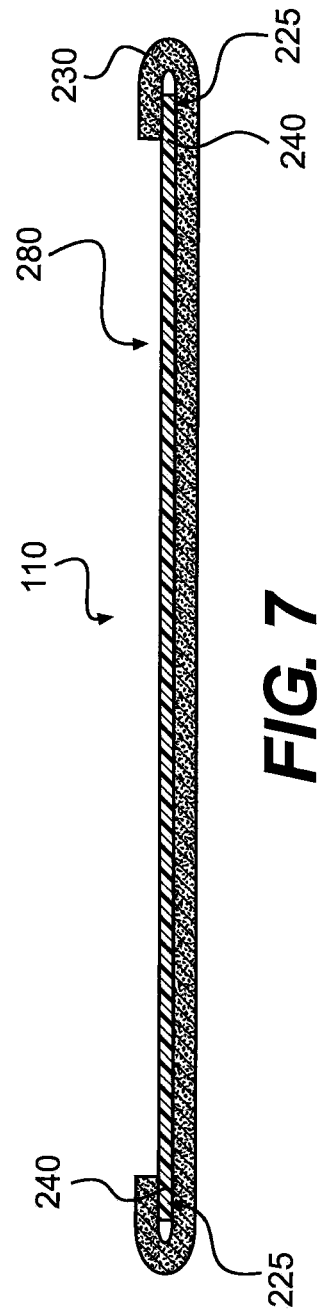
FIG. 7 is a cross-section view of a front housing and a display taken along line 7-7 of FIG. 5 consistent with disclosed embodiments.

As another example, display 110 may indirectly connect PCB portion 120 to battery portion 130. More specifically, as illustrated in FIGS. 4, 5, 6 and 7, a perimeter 225 of display 110 is connected to a flexible front housing 230, which connects PCB portion 120 to battery portion 130. In particular, it is contemplated that longitudinal ends 240 of display 110 are adhered to flexible front housing 230. Alternatively or additionally, latitudinal ends 250 of display 110 are pinned or otherwise fastened to flexible front housing 230 in such a way as to allow latitudinal ends 250 to slide relative to flexible front housing 230 in a direction parallel to longitudinal axis α. For example, as shown in FIG. 6, pins 260 may be passed through slots 270 formed into latitudinal ends 250 to pin display 110 to flexible front housing 230. Although FIGS. 4, 5, 6, and 7 illustrate perimeter 225 as being integrally formed with an exposed portion 280 of display 110, it should be understood that perimeter 225 may alternatively constitute a bezel (not shown) that is formed separately from exposed portion 280 of display 110.

Like flexible rear housing 190, flexible front housing 230 is comprised of fabric, plastic, glass fiber, carbon fiber, metal mesh, TPU, silicone rubber, synthetic rubber, natural rubber, polypropylene, polyethylene, or another flexible material. Flexible front housing 230 is positioned so as to separate display 110 from PCB portion 120, battery portion 130, and flexible connector 140, and connects PCB portion 120 to battery portion 130. For example, as illustrated in FIG. 4, flexible front housing 230 may be screwed, adhered, or otherwise fastened to a rigid support strip 290 of PCB portion 120 and a rigid support strip 300 of battery portion 130 to connect PCB portion 120 to battery portion 130. In such an embodiment, flexible rear housing 190 is also screwed, adhered, or otherwise fastened to rigid support strip 290 of PCB portion 120 and rigid support strip 300 of battery portion 130 to connect PCB portion 120 to battery portion 130. Alternatively, as illustrated in FIG. 5, flexible front housing 230 may be screwed, adhered, or otherwise fastened to rigid PCB housing 200 of PCB portion 120 and rigid battery housing 210 of battery portion 130 to connect PCB portion 120 to battery portion 130.

It is contemplated that the above-described features of device 100 may individually or in combination benefit device 100's user. For example, as discussed above, flexible display 110 extends continuously, without breaks or seams, from an area above PCB portion 120, across flexible connector 140, to an area above battery portion 130. Therefore, it is contemplated that flexible display 110 may have a relatively large display area. Additionally, as discussed above, flexible connector 140 may twist or bend to allow device 100 to more easily fit into small compartments such as, for example, a user's pocket, purse, or briefcase. Further, since flexible connector 140 is comprised of a rubberlike substance, it is contemplated that device 100 may be less susceptible to damage than devices having multi-piece connectors, including, for example, hinges, pins, and springs.

While specific embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting.

What is claimed is:

1. A flexible mobile computing device, comprising:
   a flexible display having a first display portion, a second display portion, and a third display portion positioned, along a longitudinal axis of the flexible mobile computing device, between the first and second display portions;
   a printed circuit board (PCB) portion positioned behind the first display portion;
   a battery portion positioned behind the second display portion; and
   a flexible connector positioned behind the third display portion, extending along a latitudinal axis of the flexible mobile computing device, and connecting the PCB portion to the battery portion, the flexible connector consisting essentially of an elastomeric material and being configured to permit the first display portion to twist relative to the second display portion about an axis that is substantially parallel to the longitudinal axis of the flexible mobile computing device.

2. The flexible mobile computing device of claim 1, wherein the flexible connector is configured to permit the first display portion to twist relative to the second display portion such that a maximum twisting angle of the first display portion relative to the second display portion is in a range of approximately 1° to approximately 45°.

3. The flexible mobile computing device of claim 2, wherein the maximum twisting angle is approximately 30°.

4. The flexible mobile computing device of claim 1, wherein:
   the PCB portion includes a PCB;
   the battery portion includes a battery; and
   the flexible connector directly connects the PCB to the battery.

5. The flexible mobile computing device of claim 4, comprising:
   a flexible rear housing positioned behind the PCB portion, the battery portion, and the flexible connector; and
   a flexible front housing positioned so as to separate the display from the PCB portion, the battery portion, and the flexible connector.

6. The flexible mobile computing device of claim 1, wherein:
   the PCB portion includes a rigid PCB housing and a PCB;
   the battery portion includes a rigid battery housing and a battery; and
   the flexible connector indirectly connects the PCB to the battery via the rigid PCB housing and the rigid battery housing.

7. The flexible mobile computing device of claim 6, comprising a flexible front housing positioned so as to separate the display from the PCB portion, the battery portion, and the flexible connector.

8. A flexible mobile computing device, comprising:
   a flexible display having a first display portion, a second display portion, and a third display portion positioned between the first and second display portions;
   a printed circuit board (PCB) portion positioned behind the first display portion;
   a battery portion positioned behind the second display portion; and
   a flexible connector positioned behind the third display portion and connecting the PCB portion to the battery portion, the flexible connector being configured to permit inward and outward bending of the flexible mobile computing device such that:
   a maximum inward bending angle formable between the first display portion and the second display portion is in a range of approximately 1° to approximately 60°; and
   a maximum outward bending angle formable between the first display portion and the second display portion is in a range of approximately 1° to approximately 45°, and
   wherein the flexible connector consists essentially of an elastomeric material and is configured to permit the first display portion to twist relative to the second display portion about an axis that is substantially parallel to a longitudinal axis of the flexible mobile computing device.

9. The flexible mobile computing device of claim 8, wherein the maximum inward bending angle is in a range of approximately 5° to approximately 50°.

10. The flexible mobile computing device of claim 9, wherein the maximum inward bending angle is approximately 45°.

11. The flexible mobile computing device of claim 8, wherein the maximum outward bending angle is in a range of approximately 5° to approximately 35°.

12. The flexible mobile computing device of claim 11, wherein the maximum outward bending angle is approximately 30°.

13. The flexible mobile computing device of claim 8, wherein:
    the PCB portion includes a PCB;
    the battery portion includes a battery; and
    the flexible connector directly connects the PCB to the battery.

14. The flexible mobile computing device of claim 13, comprising:
    a flexible rear housing positioned behind the PCB portion, the battery portion, and the flexible connector; and
    a flexible front housing positioned so as to separate the display from the PCB portion, the battery portion, and the flexible connector.

15. The flexible mobile computing device of claim 8, wherein:
    the PCB portion includes a rigid PCB housing and a PCB;
    the battery portion includes a rigid battery housing and a battery; and
    the flexible connector indirectly connects the PCB to the battery via the rigid PCB housing and the rigid battery housing.

16. The flexible mobile computing device of claim 15, comprising a flexible front housing positioned so as to separate the display from the PCB portion, the battery portion, and the flexible connector.

17. The flexible mobile computing device of claim 8, wherein:
    the third display portion is positioned, along the longitudinal axis of the flexible mobile computing device, between the first and second display portions; and
    the flexible connector extends along a latitudinal axis of the flexible mobile computing device.

18. A flexible mobile computing device, comprising:
    a flexible display having a first display portion, a second display portion, and a third display portion positioned, along a longitudinal axis of the flexible mobile computing device, between the first and second display portions;
    a printed circuit board (PCB) portion positioned behind the first display portion, and including a PCB;

a battery portion positioned behind the second display portion, and including a battery that is electrically connected to the PCB via a cable; and a flexible connector separate from the cable, positioned behind the third display portion, extending along a latitudinal axis of the flexible mobile computing device, and connecting the PCB portion to the battery portion, the flexible connector consisting essentially of an elastomeric material and being configured to:

permit the first display portion to twist relative to the second display portion about an axis that is substantially parallel to the longitudinal axis of the flexible mobile computing device; and permit inward and outward bending of the flexible mobile computing device.

* * * * *